United States Patent
Azuma

(10) Patent No.: US 8,127,340 B2
(45) Date of Patent: Feb. 28, 2012

(54) COMMUNICATION APPARATUS

(75) Inventor: Yoshikazu Azuma, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 466 days.

(21) Appl. No.: 12/205,180

(22) Filed: Sep. 5, 2008

(65) Prior Publication Data
US 2009/0070857 A1    Mar. 12, 2009

(30) Foreign Application Priority Data
Sep. 10, 2007   (JP) .................. 2007-234019

(51) Int. Cl.
*G06F 7/04* (2006.01)
*H04L 9/32* (2006.01)
(52) U.S. Cl. .......................................... 726/3; 713/168
(58) Field of Classification Search ....... 726/3; 713/168
See application file for complete search history.

(56) References Cited

U.S. PATENT DOCUMENTS

| | | | |
|---|---|---|---|
| 2004/0003304 A1* | 1/2004 | Kobayashi | 713/300 |
| 2006/0269341 A1* | 11/2006 | Aoki et al. | 400/62 |
| 2006/0277406 A1* | 12/2006 | Hashimoto et al. | 713/168 |
| 2007/0028103 A1* | 2/2007 | Sugi | 713/168 |
| 2007/0195364 A1* | 8/2007 | Umehara et al. | 358/1.15 |
| 2007/0271595 A1* | 11/2007 | Jin et al. | 726/3 |
| 2008/0077789 A1* | 3/2008 | Gondo | 713/155 |

FOREIGN PATENT DOCUMENTS

| | | |
|---|---|---|
| JP | 2002-34066 | 1/2002 |
| JP | 2004-254277 | 9/2004 |
| JP | 3628315 | 12/2004 |

* cited by examiner

*Primary Examiner* — Techane Gergiso
(74) *Attorney, Agent, or Firm* — Oblon, Spivak, McClelland, Maier & Neustadt, L.L.P.

(57) ABSTRACT

An authentication unit performs an authentication processing to obtain a permission for a physical interface including a driver to establish a connection to a network to perform a data transfer. A detecting unit detects authentication state information indicating a state of the authentication processing. Upon receiving the authentication state information from the detecting unit, a transmission control unit controls a transmission of data received from a module for performing a communication based on a protocol of an upper-level layer with respect to a data link layer to an external device based on the state of the authentication processing.

9 Claims, 7 Drawing Sheets

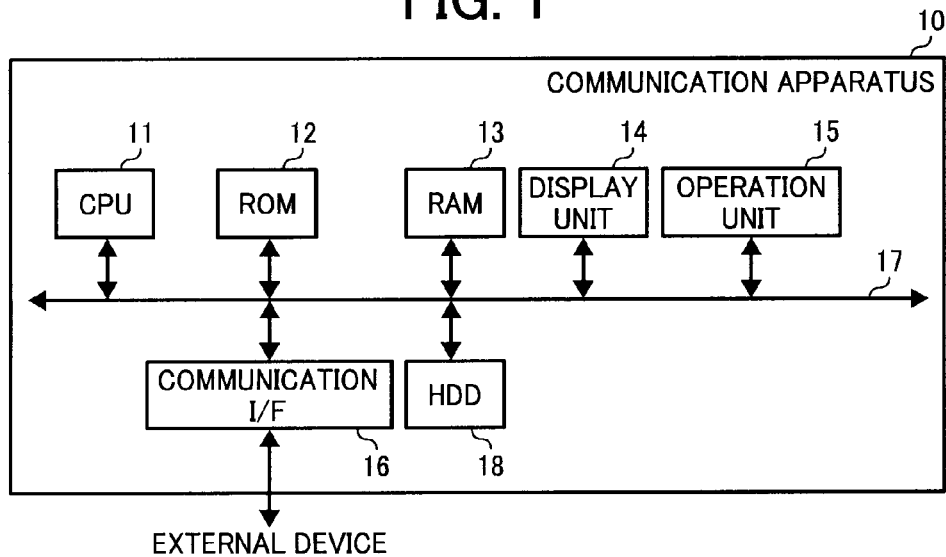
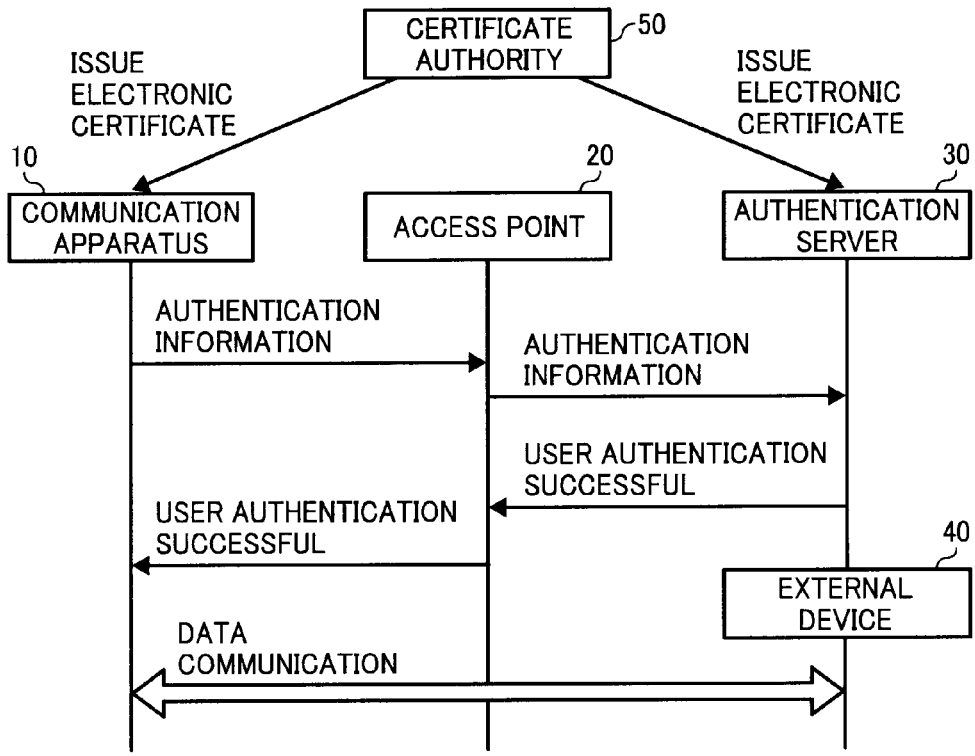

FIG. 6A

USER LOGIN

USER ID    TEST 1

PASSWORD  *****

SETTING OF AUTHENTICATION START TIMEOUT

-TIMEOUT IS SET TO

300 SEC.

SAVE    BACK

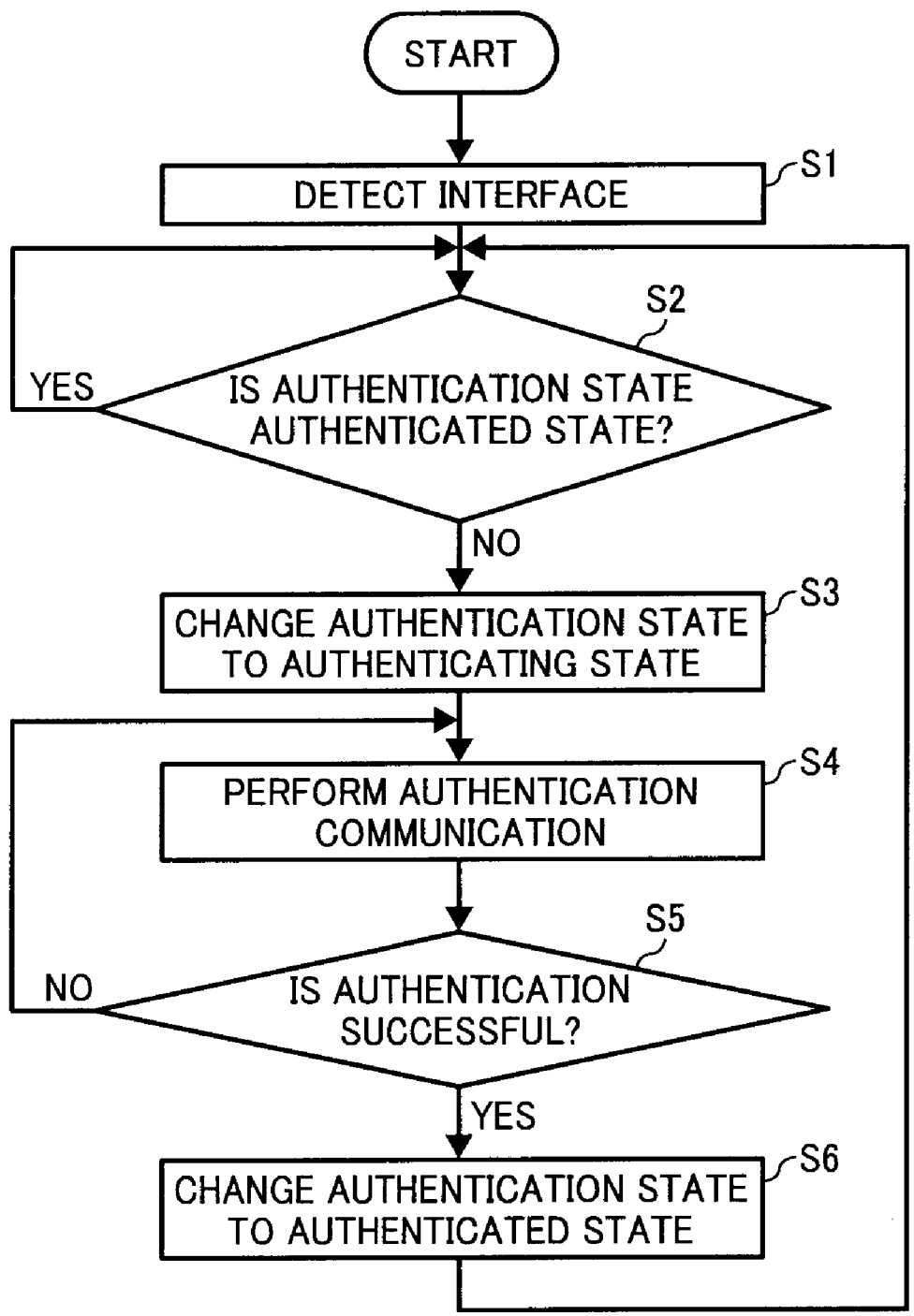

COMMUNICATION APPARATUS

CROSS-REFERENCE TO RELATED APPLICATIONS

The present document incorporates by reference the entire contents of Japanese priority document, 2007-234019 filed in Japan on Sep. 10, 2007.

BACKGROUND OF THE INVENTION

1. Field of the Invention

The present invention relates to a technology for performing an authentication processing to obtain a permission for a data transfer when connecting a physical interface to a network.

2. Description of the Related Art

There has been a demand for communication security using, for example, an encryption or an authentication of a communication via a network, and the demand is increasing along with a wide use of the Internet because any person who has knowledge of networks to some extent is capable of sniffing or modifying data relatively easily. For this reason, security devices, which used to be for special devices and manufactured on special orders, are recently widely adapted to, for example, software on a personal computer (PC), an image processing apparatus, and a communication apparatus and used in general offices.

In a device connectable to a network such as the Internet, in which the network and related programs are layered, a processing such as an encryption or an authentication is performed in each layer of the open systems interconnection (OSI) reference model for each purpose.

A transmission control protocol/Internet protocol (TCP/IP) communication on a local area network (LAN) is explained below based on the OSI reference model. A physical layer of Layer 1 and a data link layer of Layer 2 correspond to an interface card of, for example, Ethernet (Registered Trademark) (IEEE 802.3) or a wireless LAN (IEEE 802.11), defining a physical (PHY) communication protocol and a media access control (MAC) protocol, respectively. A network layer of Layer 3 and a transport layer of Layer 4 define an IP protocol and a TCP protocol, respectively. Upper-level layers with respect to the Layer 4 are application layers.

A technology in which an encryption and an authentication can be performed in each layer is available, in which contents data is encrypted based on an application protocol of the highest-level layer; a secure socket layer (SSL) is used for the TCP protocol; a security architecture for Internet protocol (IPSec) is used for the IP protocol; and all data of communications including communications in a MAC layer is encrypted based on the MAC protocol. Although an authentication is required for both a transmission destination and a transmission source in each encryption to share an encryption key, it can be implemented by various types of encryption systems.

When a communication apparatus communicates with an external device via a network, if it is configured to perform an authentication processing in each layer, it is important to control an operation of the communication apparatus depending on a progress of the authentication processing. Technologies relating to the authentication processing are disclosed in some documents. For example, Japanese Patent Application Laid-open No. 2004-254277 discloses a technology for achieving a high-speed IP connection, in which, after detecting a successful authentication, an IP processing unit or a high-speed IP connection processing unit immediately makes a request for a rooter advertisement message so that a subsequent IP connection processing is started at an early stage by the rooter advertisement message received in response to the request. Furthermore, Japanese Patent No. 3628315 discloses a technology for handling an upper-level protocol stack when performing an operation based on an authentication protocol (PPPoE or IEEE 802.1X) on a wireless LAN, in which a middle-level protocol stack monitors a connection status and adjusts a disconnection notification to the upper-level protocol stack, thereby preventing frequent disconnections or abnormal connections of the wireless LAN that is an unstable communication medium. Moreover, Japanese Patent Application Laid-open No. 2002-034066 discloses a technology for a wireless information communication terminal in which a data link layer control unit detects a usable wireless range and achieves a display indicating that a processing for an authentication or a subscription during a communication is successful.

Among the layers, for example, in the interface card portion, in the case of being authenticated by the external device based on an authentication protocol for a connection to the network, a protocol essentially higher than the interface card portion should not perform a communication because of the following reason. For example, when the authentication is successful, in the case of performing an encryption communication in which the communication apparatus shares an encryption key with a device to communicate with, such as a hub in the case of a wired communication or an access point in the case of a wireless LAN, the communication cannot be performed even if an upper-level protocol tries a communication before the authentication of the communication apparatus. Furthermore, even when the encryption is not performed in the above case, data cannot be transmitted from the hub or the access point to the network before the communication apparatus is authenticated. As a result, a communication protocol address may not be received or a duplication of a communication protocol address may not be detected. For example, in the TCP/IP, even if data for address resolution is transmitted in an unauthenticated state, the duplication of the IP address may not be detected. Moreover, when the communication apparatus in the unauthenticated state transmits data other than that for the authentication processing (hereinafter, "authentication communication data") to the external device, a control unit of the external device may detect that a large volume of abnormal unauthenticated data is transmitted to the external device and terminates the data communication, which deters the authentication processing. Furthermore, when the data from an upper-level application and the authentication communication data are received together during a data communication for the authentication processing (hereinafter, "authentication communication"), the authentication communication may be started over from the beginning for many times, which deters the authentication processing. This can easily occur when a disconnection occurs in a lower-level layer and the authentication communication is started over from the unauthenticated state, because the upper-level application cannot stop a communication promptly.

The technologies disclosed in Japanese Patent Application Laid-open No. 2004-254277, Japanese Patent No. 3628315, and Japanese Patent Application Laid-open No. 2002-034066 do not sufficiently solve the above problems. Particularly in an apparatus, such as an image forming apparatus, in which realizable functions are implemented in advance, the above problems cannot be easily solved.

SUMMARY OF THE INVENTION

It is an object of the present invention to at least partially solve the problems in the conventional technology.

According to an aspect of the present invention, there is provided a communication apparatus for communicating with an external device via a network, including an authentication unit that performs an authentication processing to obtain a permission for a physical interface including a driver to establish a connection to the network to perform a data transfer; a detecting unit that detects authentication state information indicating a state of the authentication processing performed by the authentication unit; and a transmission control unit that receives the authentication state information from the detecting unit, and controls a transmission of first data received from a module for performing a communication based on a protocol of an upper-level layer with respect to a data link layer to the external device based on the state of the authentication processing indicated by the authentication state information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a block diagram of a hardware configuration of a communication apparatus according to an embodiment of the present invention;

FIG. 2 is a schematic diagram for explaining an authentication processing;

FIGS. 6A and 6B are schematic diagrams of examples of displays on a screen of a display unit via which a user sets a predetermined time;

FIG. 7 is a flowchart of a processing performed by the communication apparatus, which mainly relates to an authentication application.

DETAILED DESCRIPTION OF THE PREFERRED EMBODIMENTS

Figure 3:
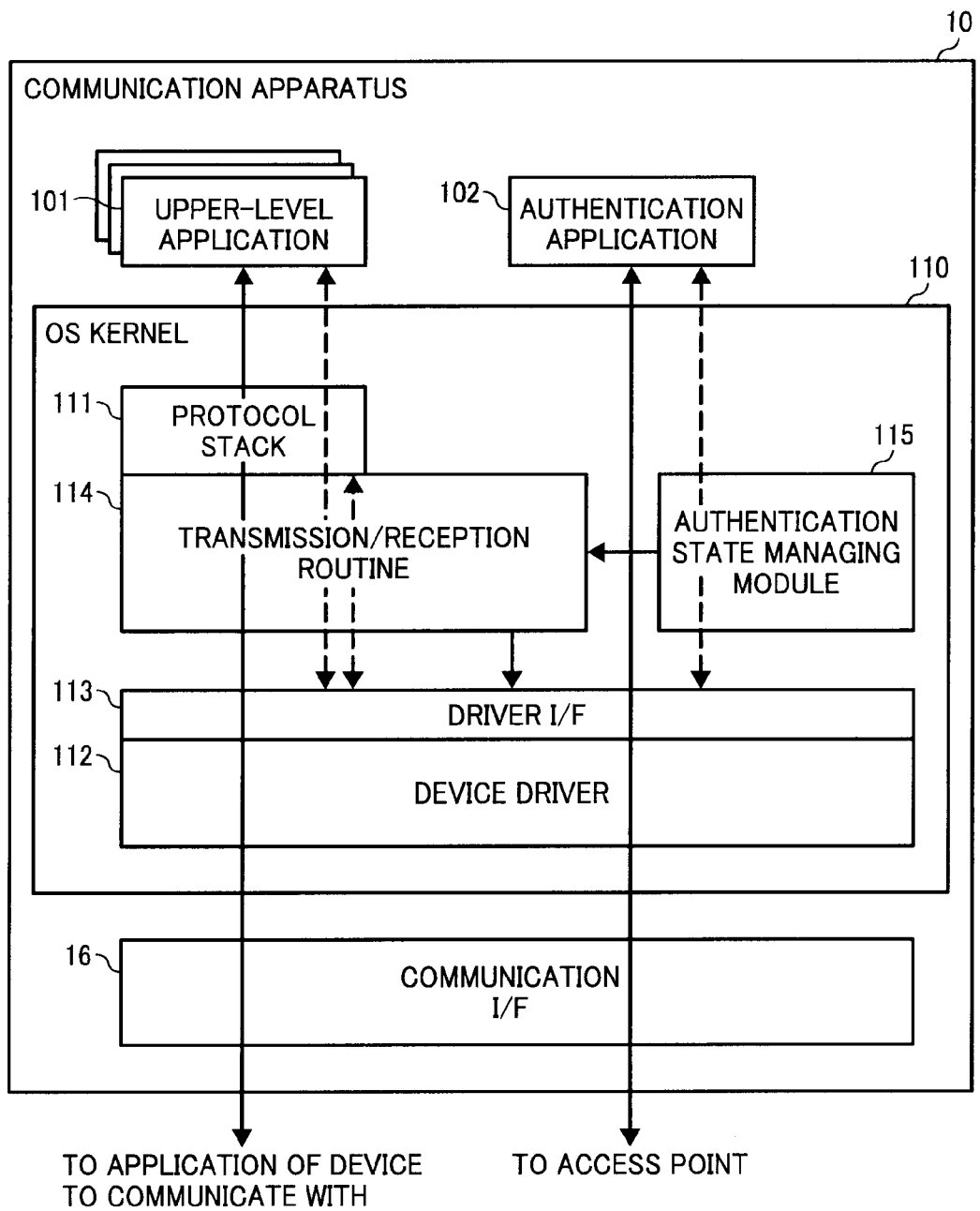
FIG. 3 is a schematic diagram of a software configuration of the communication apparatus.

Exemplary embodiments of the present invention are explained in detail below with reference to the accompanying drawings.

A communication apparatus 10 according to an embodiment of the present invention is explained in detail below. FIG. 1 is a block diagram of a hardware configuration of the communication apparatus 10. The communication apparatus includes a central processing unit (CPU) 11, a read only memory (ROM) 12, a random access memory (RAM) 13, a display unit 14, an operation unit 15, a communication interface (I/F) 16, and a hard disk drive (HDD) 18. These units are connected to each other via a system bus 17.

The CPU 11 serves as a control unit that controls the communication apparatus 10. By executing various types of computer programs stored in the ROM 12, the CPU 11 realizes various types of functions of the communication apparatus 10, such as an authentication unit and a communication control unit. The ROM 12 is a nonvolatile storage unit that stores therein data including the computer programs executed by the CPU 11 and fixed parameters. The RAM 13 temporarily stores data, and is used as a work memory of the CPU 11. The HDD 18 is a nonvolatile rewritable storage unit that stores various types of data.

The display unit 14 includes a display such as a liquid crystal display. The display unit 14 displays an operating status of the communication apparatus 10, setting contents, a graphical user interface (GUI) for receiving an instruction from a user, and a message to the user. The operation unit 15 includes keys and buttons for receiving an instruction from the user.

The communication apparatus 10 can communicate with other devices via the communication I/F 16 and a communication path. The communication I/F 16 can be, for example, a network interface that is connected to a network for a wired communication based on the IEEE 802.3 (Ethernet) or a wireless communication based on the IEEE 802.11. More specifically, a network interface card can be adopted for the communication I/F 16.

When the communication apparatus 10 communicates with a device, the communication I/F 16 and the CPU 11 function as a communication unit. An appropriate device is prepared for the communication I/F 16 depending on the standards of the communication path and communication protocols to be used. The communication path can be arbitrary wired or wireless communication path. Furthermore, when a plurality of types of standards is adopted, a plurality of communication I/Fs 16 that corresponds to the types respectively can be used.

For example, NetWare using the Internet work Packet eXchange/Sequenced Packet exchange (IPX/SPX) instead of the TCP/IP can be used. In the embodiment, a communication protocol obtained by applying an authentication implementation by the IEEE 802.1X to the IEEE 802.11i (known as the Wi-Fi protected access (WPA)) that is a security extension of the IEEE 802.11 is employed to achieve a communication in which security is ensured between the communication apparatus 10 and an external device.

The communication apparatus 10 can include various types of constituents depending on purposes. For example, if the communication apparatus 10 is configured as a digital multifunction peripheral (MFP) having functions of, for example, printing, facsimileing, scanning, copying, and storing documents, it is considered that the communication apparatus 10 includes a print engine and a scanner engine. If the communication apparatus 10 is not configured to display information thereon or receive instructions, the display unit 14 and the operation unit 15 are unnecessary.

The communication apparatus 10 is connectable to the network via the communication I/F 16. Because the communication apparatus 10 employs the IEEE 802.11i as the communication protocol, the communication path is wireless and a device with which the communication apparatus 10 directly communicates when connecting to the network is, for example, an access point 20 (see FIG. 2) of a wireless LAN.

Because the communication apparatus 10 employs the authentication implementation based on the IEEE 802.1X, when starting a communication via the network, it is necessary for the communication apparatus 10 to obtain a permission for establishing a connection to the access point 20 by performing an authentication processing based on the extended authentication protocol over LAN (EAPoL). The authentication processing is a processing for establishing, based on the MAC protocol, a communication path of the data link layer between the communication apparatus 10 and a device with which the communication apparatus 10 directly communicates.

FIG. 2 is a schematic diagram for explaining the authentication processing. Based on the EAPoL, the communication apparatus 10 performs the authentication processing via the access point 20 with which the communication apparatus 10 directly communicates. Specifically, the access point 20 relays authentication information received from the communication apparatus 10 to an authentication server 30 and the authentication server 30 determines whether the communication apparatus 10 is authentic. When the communication apparatus 10 is authenticated, the communication apparatus 10 obtains a permission for establishing a connecting to the access point 20, so that the communication apparatus 10 can perform data communication with an external device 40 on the network via the access point 20.

In an authentication communication, a password authentication of a challenge-response system or a public key cryptosystem using a public key infrastructure (PKI) is used, and an electronic certificate that is issued by a certificate authority 50 and used for an authentication using the public cryptosystem is set in advance in the communication apparatus 10 and the authentication server 30. After the communication apparatus 10 is permitted to connect to the access point 20, data to be communicated is encrypted in some cases. In this case, for example, when the authentication is completed, a key used for encryption and source data of the key can be transmitted from the authentication server 30 to the communication apparatus 10.

A common key cryptosystem or a public key cryptosystem is generally used for encryption for security. Because the public key cryptosystem accompanies more processing compared with the common key cryptosystem, the public key cryptosystem is not suitable for encrypting all data in communications. For this reason, in many cases, the public key cryptosystem is used when communicating a relatively small amount of information such as the authentication information including a password for an authentication and a key for the common key cryptosystem. In the embodiment, the public key cryptosystem is employed. However, encryption is not limited to the public key cryptosystem.

In some cases, an authentication (connection permission) is unnecessary. In such a case, the communication apparatus 10 and the external device 40 can perform data communication therebetween without performing the authentication processing. Whether an authentication is required can be set by the user by giving an instruction via the operation unit 15. Authentication determination information indicating whether an authentication is required is stored in, for example, the HDD 18. The communication apparatus 10 refers to the authentication determination information stored in the HDD 18 when, for example, being started, and determines whether to perform the authentication processing.

FIG. 3 is a schematic diagram of a software configuration of the communication apparatus 10. The communication apparatus 10 includes an upper-level application 101, an authentication application 102, and an operation system (OS) kernel 110 as the computer programs executed by the CPU 11. Although the communication I/F 16 is hardware, the communication I/F 16 is shown in FIG. 3 for easier explanation.

Figure 4:
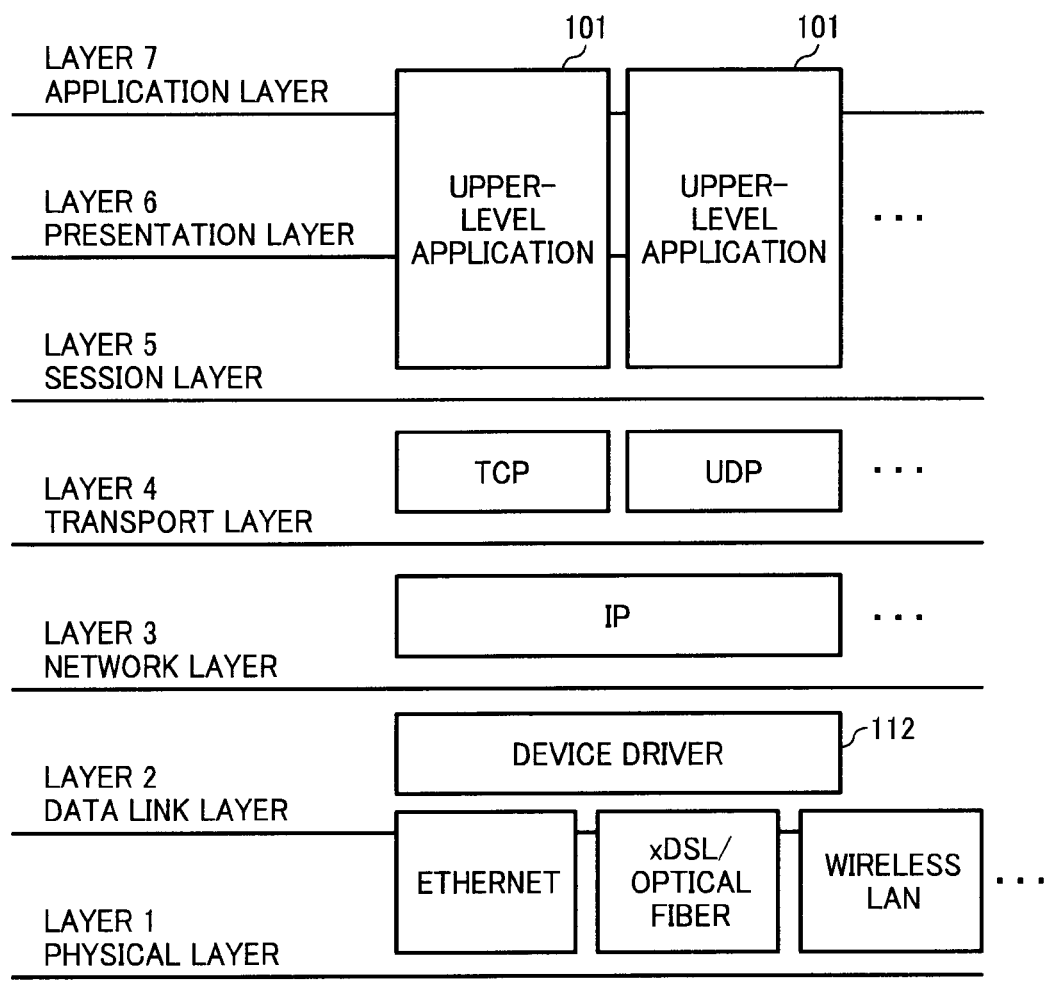
FIG. 4 is a schematic diagram for explaining a relationship between the software shown in FIG. 3 and the OSI reference model.

The OS kernel 110 includes a protocol stack 111, a device driver 112, a driver I/F 113, a transmission/reception routine 114, and an authentication state managing module 115. The protocol stack 111 is a program module for realizing communication functions of Layer 4 (transport layer) and Layer 3 (network layer) of the OSI reference model shown in FIG. 4, such as the TCP/IP or the user datagram protocol (UDP)/IP.

The device driver 112 is a program module for controlling the communication I/F 16 of Layer 1 (physical layer) and realizing communication functions of Layer 2 (data link layer). The device driver 112 is provided for each communication I/F 16. The driver I/F 113 is a program module as a single interface of the device driver 112 such that data from the protocol stack 111 or the authentication application 102 that uses the device driver 112 can be transmitted/received, controlled, and monitored via the single interface not depending on the type of the device driver 112 and the communication I/F 16 controlled by the device driver 112.

The upper-level application 101 is a program module group for realizing communication functions of Layer 7 (application layer), Layer 6 (presentation layer), and Layer 5 (session layer) of the OSI reference model, or a program module group for realizing various types of functions using those communication functions.

As the upper-level application 101, computer programs for realizing, for example, a function for transmitting/receiving a file between the communication apparatus 10 and an external device based on an instruction given by the user, a function for making a response to a request from the external device by a certain operation, and a function for notifying the external device of the state of the communication apparatus 10 can be provided. Alternatively, a computer program for browsing websites based on an instruction from the user or sending/receiving an electronic mail (e-mail) can be provided as the upper-level application 101. Furthermore, the upper-level application 101 can be configured to operate in combination with a security program for, for example, authenticating a device with which the communication apparatus 10 communicates (the device is not limited to a device directly connected to the communication apparatus 10 on the network, such as the access point 20) or encrypting data to be communicated. Alternatively, a computer program for realizing a function for performing various types of setting including setting a protocol stack group or a function for obtaining/setting an address of the protocol stack 111 can be provided as the upper-level application 101. Such functions can be incorporated in the functions of the OS kernel 110. In other words, various types of configurations can be adopted.

The upper-level application 101 performs data communication with an external device via the protocol stack 111, the transmission/reception routine 114, the driver I/F 113, and the device driver 112.

The authentication application 102 is a program module for, when the communication apparatus 10 communicates with an external device to which the communication apparatus 10 is directly connected on the network via the device driver 112 and the communication I/F 16, performing the authentication processing for establishing a communication path between the communication apparatus 10 and the external device, i.e., for obtaining a permission for a physical interface of the communication apparatus 10 to establishing a connection to the network for a data transfer.

When the communication apparatus 10 and the external device communicate with each other based on the standards of the Ethernet, all data transmitted from the communication apparatus 10 contains an Ethernet type. When performing an authentication communication, the authentication application 102 sets "X8888" as the Ethernet type as well as a user ID, a password, and an electronic certificate in data, and transmits the data containing the above information as the authentication information.

The above system for the authentication processing varies depending on the communication protocol used for a communication by the communication I/F 16 and the device driver 112. In the embodiment, the authentication application 102 corresponds to an appropriate system. For example, for an authentication implementation based on the IEEE 802.1X employed by the communication apparatus 10, the authentication application 102 is configured to perform the authentication processing using the EAPoL. Alternatively, a plurality of authentication applications 102 corresponding respectively to different systems can be used such that one of the authentication applications 102 is executed based on the communication protocol to be used and the authentication application 102 performs the authentication processing.

Figure 5:
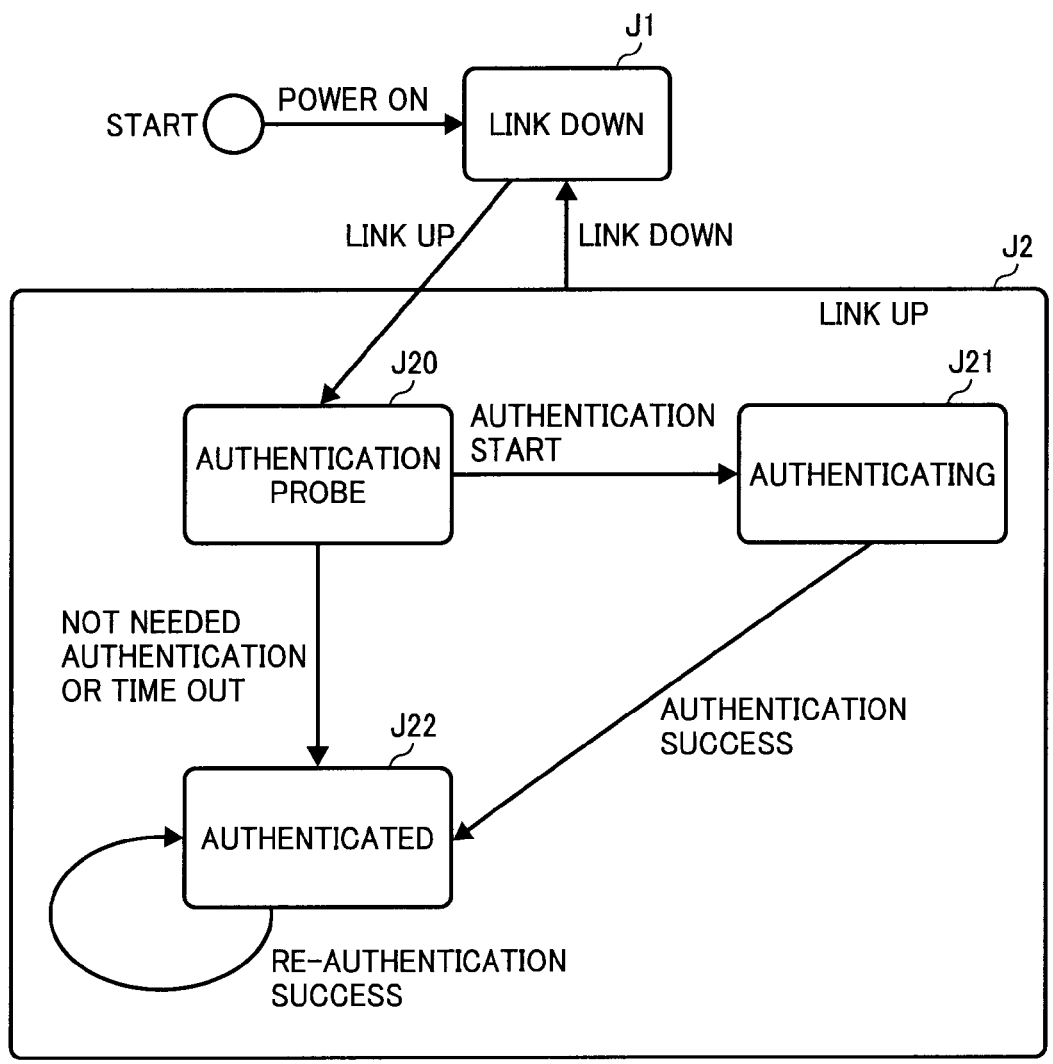
FIG. 5 is a schematic diagram for explaining a transition of an authentication state depending on the authentication processing or a timeout.

FIG. 5 is a schematic diagram for explaining a change of an authentication state because of the authentication processing or a timeout. When the power supply to the communication apparatus 10 starts and a connection is detected, the authentication state enters a link up state J2. When a disconnection is detected, the authentication state changes to a link down state J1. The connection and the disconnection can be used as common ideas between a wired LAN (for example, the IEEE 802.3 Ethernet) and a wireless LAN (for example, the IEEE 802.11). The device driver 112 detects a connection and a disconnection from the state of the device. After the authentication state changes from the link up state J2 to an authentication probe state J20 in which whether an authentication is required is monitored. When the authentication application 102 starts the authentication processing, the authentication state changes to an authenticating state J21. When the authentication processing is completed, the authentication state changes to an authenticated state J22. When the authentication processing is not started in a predetermined time after the change of the authentication state to the authentication probe state J20, a timeout occurs and the authentication state changes to the authenticated state J22. When it is determined that an authentication is not required based on the authentication determination information, the authentication application 102 does not perform the authentication processing, so that the authentication state changes from the authentication probe state J20 to the authenticated state J22. The authentication probe state J20 and the authenticating state J21 are collectively referred to as an unauthenticated state.

The authentication state managing module 115 detects the authentication probe state J20 or the authentication state (i.e., the authenticating state J21 or the authenticated state J22) in which the authentication application 102 performs the authentication processing, and transmits the authentication state information indicating the authentication state to the transmission/reception routine 114.

The transmission/reception routine 114 performs transmission control. Specifically, the transmission/reception routine 114 adds a header and the like to data to be transmitted depending on the protocol or removes a header from data received by the device driver 112. The transmission/reception routine 114 also transmits data (hereinafter, "transmission data") from the authentication application 102 to the device driver 112 via the driver I/F 113. Furthermore, the transmission/reception routine 114 makes an inquiry for the authentication state (hereinafter, "authentication state inquiry") to the authentication state managing module 115, receives the authentication state information, and determines whether data from the upper-level application 101 or the protocol stack 111 (hereinafter, "transmission data") can be transmitted based on the authentication state indicated by the authentication state information. Because the transmission/reception routine 114 closely relates to the protocol stack 111, the transmission/reception routine 114 can be configured as a part of the protocol stack 111.

The transmission/reception routine 114 measures the time after making the authentication state inquiry to the authentication state managing module 115 (hereinafter, "waiting time"). When the transmission/reception routine 114 cannot receive the authentication state information even when the waiting time reaches a predetermined time, the transmission/reception routine 114 determines that the authentication state is the authenticated state and controls transmission of the transmission data.

The predetermined time is set by the user, and stored in, for example, the HDD 18. FIGS. 6A and 6B are schematic diagrams of examples of displays on a screen of the display unit 14 via which the user sets the predetermined time. The user inputs a user ID and a password in the columns on the screen shown in FIG. 6A via the operation unit 15. Thereafter, the user inputs a desired predetermined time in the column on the screen shown in FIG. 6B. The CPU 11 switches the screen of the display unit 14 from the display shown in FIG. 6A to the display shown in FIG. 6B. When the user inputs the predetermined time, the CPU 11 stores the predetermined time in the HDD 18.

Because the OS kernel 110 configures the transmission/reception routine 114 and the authentication state managing module 115, the OS kernel 110 integrally manages the authentication state and controls a transmission of data from the upper-level application 101 or the protocol stack 111.

Operations of the communication apparatus 10 are explained below. FIG. 7 is a flowchart of operations of the communication apparatus 10, which mainly relates to the authentication application 102. To simplify the explanation, the processing performed by executing the software shown in FIG. 3 is explained as the processing performed by the software.

The OS kernel 110 automatically boots when the power supply to the communication apparatus 10 starts. The OS kernel 110 detects the communication I/F 16 (Step S1). The OS kernel 110 receives connection information indicating whether a physical connection is maintained between the communication I/F 16 and a device (in the embodiment, the access point 20) with which the communication I/F 16 directly communicates. The connection information indicates whether, in the case of a wired communication, a cable connection is achieved or, in the case of a wireless communication, a wireless signal at a predetermined level or more is received from the device with which the communication I/F 16 communicates. Because the connection information is detected by the communication I/F 16, the device driver 112 receives the connection information from the communication I/F 16 as a control operation for the communication I/F 16. When the OS kernel 110 determines that an authentication is required based on the authentication determination information stored in the HDD 18, the OS kernel 110 executes the authentication application 102 to perform the authentication processing such that the communication I/F 16 can establish a communication path of the data link layer between the communication I/F 16 and the access point 20 depending on the type of the communication I/F 16 detected by the OS kernel 110.

The OS kernel 110 initializes the protocol stack 111. The initialization includes a processing for setting an address such as an IP address that is necessary for performing a communication, executing an application necessary for setting the address, and causing the protocol stack 111 to receive an address from, for example, a dynamic host configuration protocol (DHCP) server and set therein the address. The OS kernel 110 executes the upper-level application 101. The upper-level application 101 requests the protocol stack 111 to communicate with the upper-level application 101 and transmits data to the protocol stack 111.

On the other hand, when the authentication state is not the authenticated state (NO at Step S2), the authentication application 102 changes the authentication state to the authenticating state (Step S3) and causes the device driver 112 to perform the authentication communication between the device driver 112 and the access point 20 (Step S4). In the authentication communication, the authentication application 102 transmits the authentication information to the access point 20 as shown in FIG. 2. When the authentication application 102 receives the result of authentication (hereinafter, "authentication result") indicating that the authentication is successful from the access point 20 (YES at Step S5), the authentication application 102 changes the authentication state to the authenticated state (Step S6), so that the communication apparatus 10 can communicate, via the access point 20, with an arbitrary device connected to the network. When the authentication application 102 does not receive the authentication result indicating that the authentication is successful from the access point 20 (NO at Step S5), the authentication communication at Step 4 is continued.

On the other hand, upon receiving the authentication state inquiry from the transmission/reception routine 114, the authentication state managing module 115 transmits the authentication state information indicating the authentication state to the transmission/reception routine 114. The transmission/reception routine 114 regularly makes the authentication state inquiry.

Figure 8:
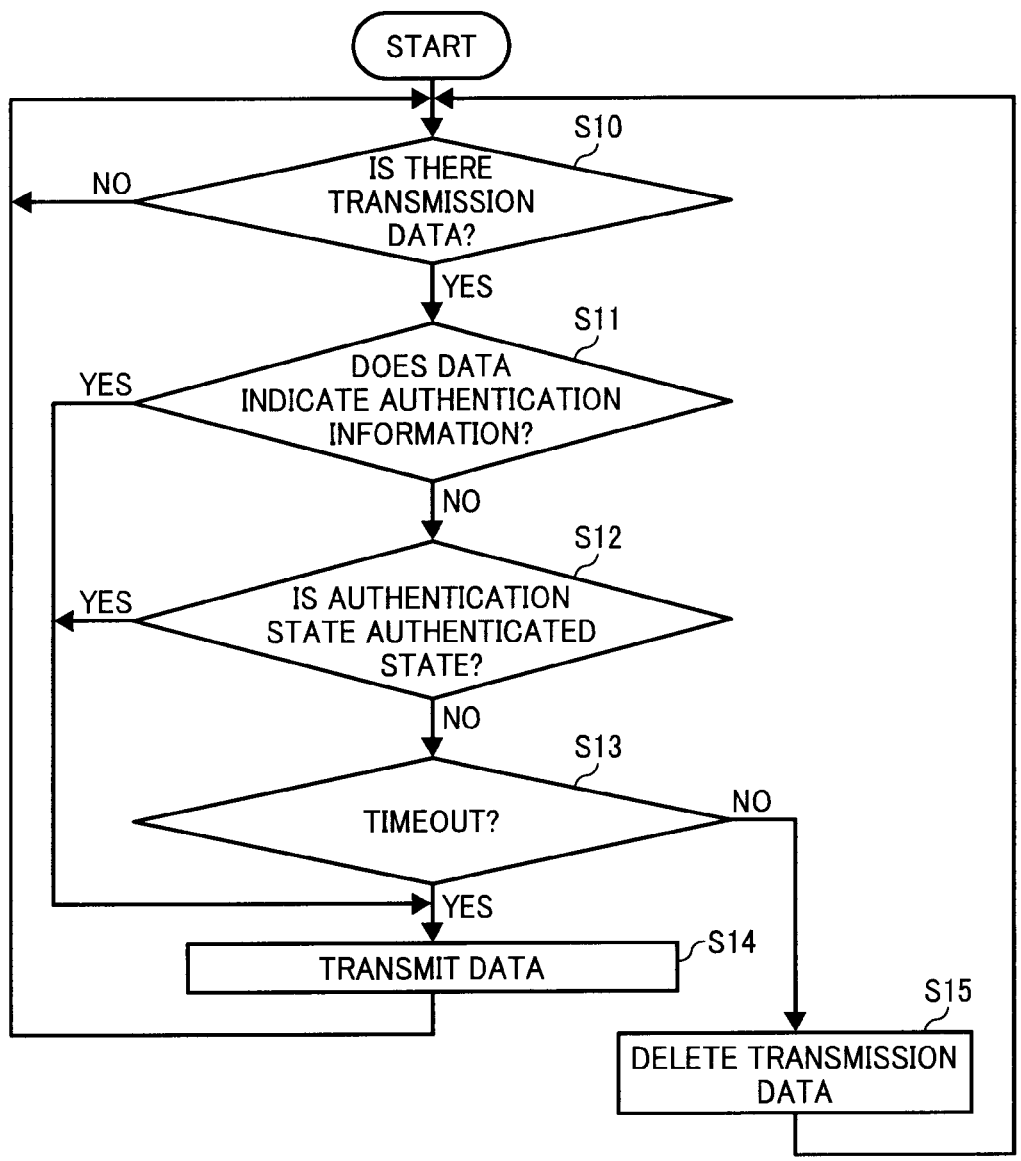
FIG. 8 is a flowchart of a processing performed by executing a transmission/reception communication routine by a CPU.

The transmission control by the transmission/reception routine 114 is explained below. FIG. 8 is a flowchart of the processing performed by executing the transmission/reception routine 114 by the CPU 11. When the power supply to the communication apparatus 10 is started, a predetermined initialization processing is performed. Thereafter, the transmission/reception routine 114 is executed to perform the processing shown in FIG. 8.

In addition to regularly making the authentication state inquiry to the authentication state managing module 115, the transmission/reception routine 114 measures the waiting time after making the authentication state inquiry. The transmission/reception routine 114 waits for transmission data from the upper-level application 101, the authentication application 102, or the like. When the transmission/reception routine 114 receives the transmission data (YES at Step S10), the transmission/reception routine 114 determines whether the transmission data is the authentication information for the authentication processing performed by the authentication application 102.

Whether the transmission data is the authentication information can be determined based on the Ethernet type. "X8888" is set in the Ethernet type contained in the authentication information. On the other hand, "X8888" is not set in the Ethernet type of data transmitted from the upper-level application 101 or the protocol stack 111 in the unauthenticated state. Therefore, the transmission/reception routine 114 can determine whether the transmission data is the authentication information based on a value set in the Ethernet type.

The transmission data is necessary for the authentication processing. Therefore, when the transmission data is the authentication information (YES at Step S11), the transmission/reception routine 114 transmits the transmission data to the device driver 112 via the driver I/F 113 and the device driver 112 transmits the authentication information to the access point 20 via the communication I/F 16 (Step S14).

When the transmission data is not the authentication information (NO at Step S11), the transmission/reception routine 114 determines that the transmission data is transmitted from the upper-level application 101 or the protocol stack 111. Therefore, the transmission/reception routine 114 determines the authentication state based on the authentication state information from the authentication state managing module 115 (Step S12). When the authentication state is the authenticated state (YES at Step S12), the communication path of a lower-level layer with respect to the data link layer is established. Therefore, the transmission/reception routine 114 transmits the transmission data to the device driver 112 via the driver I/F 113, and the device driver 112 transmits the transmission data to the external device 40 via the communication I/F 16 (Step S14).

On the other hand, when the authentication state is not the authenticated state (i.e., is the unauthenticated state) (NO at Step S12), the transmission/reception routine 114 determines whether the waiting time reaches the predetermined time stored in the HDD 18 (Step S13). When the transmission/reception routine 114 cannot receive the authentication information indicating the authenticated state even when the waiting time reaches the predetermined time (YES at Step S13), the transmission/reception routine 114 determines that the timeout occurs and the process control goes to Step S14. Specifically, in this case, the transmission/reception routine 114 determines that the authentication state is the authenticated state. This is because, when the transmission/reception routine 114 cannot receive the authentication state information in the predetermined time, it can be determined that, for example, the authentication determination information indicates that an authentication is not required; therefore, the authentication application 102 is not executed, i.e., the authentication processing is not required. In this case, because the communication path of a lower-level layer with respect to the data link layer is established without the authentication processing, the data received from the upper-level application 101 or the protocol stack 111 can be transmitted. Therefore, when the transmission/reception routine 114 cannot receive the authentication information indicating the authenticated state in the predetermined time (YES at Step S13), the process control goes to Step S14 and the transmission/reception routine 114 transmits the data received from the upper-level application 101 or the protocol stack 111 to the device driver 112 via the driver I/F 113.

When the authentication state is other than the authenticated state (NO at Step S12) and the timeout does not occur (NO at Step S13), the transmission/reception routine 114 deletes all data received from the upper-level application 101 or the protocol stack 111 (Step S15).

As explained above, when the authentication is successful, a communication based on a protocol of an upper-level layer with respect to the data link layer of the communication apparatus 10 is permitted. On the other hand, when the authentication is not successful, data transmitted from an upper-level layer with respect to the data link layer is deleted, thereby prohibiting a communication based on a protocol of an upper-level layer with respect to the data link layer.

With the above configuration, it can be prevented that the protocol stack 111 starts an initializing operation for automatically receiving an address in the unauthenticated state, a timeout occurs before receiving the address, and the process for automatically receiving the address is repeated by a retry process. This leads to stable operations based on the communication protocol.

Furthermore, it can be prevented that, when data is supposed to be encrypted, the protocol stack 111 transmits the data before a key is shared between the communication apparatus 10 and the access point 20, and unencrypted data is transmitted. This increases communication security.

The transmission control is unnecessary when an authentication is not required or after the communication apparatus 10 is authenticated. For this reason, when the authentication application 102 completes the authentication processing and the timeout occurs, the transmission/reception routine 114 removes the prohibition on data transmission. This prevents data transmission from being unnecessarily prohibited and data transmission can be performed smoothly. Furthermore, because the transmission/reception routine 114 removes the prohibition on data transmission, the prohibition on data transmission is prevented from being erroneously or intentionally removed when the authentication application 102 has to perform the authentication processing. Therefore, data transmission can be performed smoothly without reducing communication security.

For example, a configuration in which the function of managing the authentication state and controlling data transmission depending on the authentication state are implemented in the upper-level application 101 or the protocol stack 111 can be considered. However, implementation of the arbitral application (i.e., the upper-level application 101 or the protocol stack 111) is risky. Furthermore, when a new application is added, the same implementation is necessary. However, it would be difficult to implement the above function in every application. In the embodiment, the OS kernel 110, which includes the device driver 112 that transmits data to the communication I/F 16, includes the transmission/reception routine 114 and the authentication state managing module 115, and the authentication state managing module 115 integrally manages the authentication state and the transmission/reception routine 114 performs the transmission control based on the authentication state regardless of the type of the communication I/F 16. In other words, because the OS kernel 110 controlling the device driver 112 configured to perform a data communication via the communication I/F 16 includes the transmission/reception routine 114 and the authentication state managing module 115, data transmission can be controlled based on the authentication state not depending on the type of the communication I/F 16. Therefore, a stable communication can be easily achieved without reducing the communication security. Therefore, data received from an upper-level layer with respect to the data link layer of the communication apparatus 10 can be securely prevented from being transmitted in the unauthenticated state.

As explained above, the authentication state managing module 115 and the transmission/reception routine 114 are used in combination with, for example, the authentication application 102 and the device driver 112. Therefore, when connecting the communication apparatus 10 to the network and if communications other than the authentication communication are not permitted, the malfunctions due to operations of a device on a communication path, which are performed for a communication based on a protocol of an upper-level layer with respect to the data link layer and security problems can be flexibly solved not depending on other systems. In other words, flexibility of implementation can be increased.

Furthermore, by achieving implementation such that each function can be provided using a common method when the authentication state managing module 115 and the transmission/reception routine 114 are used for each interface device, when communications other than the authentication communication are not permitted, data from the upper-level application 101 or the protocol stack 111 is prevented from unnecessarily transmitted without consideration for a difference between authentication methods and a difference between devices.

The present invention is not limited to the embodiment explained above, and various modifications can be made.

As explained above, the ROM 12 stores therein the computer programs executed by the CPU 11. Alternatively, the HDD 18 can be configured to store therein the computer programs. Alternatively, the computer programs can be stored as a file in an installable or executable format in a computer-readable storage medium such as a compact disk read only memory (CD-ROM), a flexible disk (FD), a compact disk recordable (CD-R), or a digital versatile disk (DVD). Alternatively, the computer programs can be stored in a computer connected to a network such as the Internet such that the computer programs can be downloaded via the network.

As explained above, the transmission/reception routine 114 makes the authentication state inquiry to the authentication state managing module 115. Alternatively, the authentication state managing module 115 can be configured to actively notify the transmission/reception routine 114 upon detecting a change of the authentication state, which reduces the processing load to the transmission/reception routine 114.

As explained above, when the power supply to the communication apparatus 10 starts, the OS kernel 110 refers to the authentication determination information and determines whether an authentication is required. Alternatively, the transmission/reception routine 114 can be configured to refer to the authentication determination information and determines whether an authentication is required. In this case, when the transmission/reception routine 114 determines that an authentication is not required, the process control goes from Step S10 to Step S14, skipping Steps S11 to S13.

The authentication state can be notified by the authentication application 102 to the authentication state managing module 115. Alternatively, the device driver 112 can be configured to monitor data communicated via the communication I/F 16, especially the data communicated in the authentication communication, and determines the authentication state based on the contents of the data. In this case, the authentication state is notified by the device driver 112 to the authentication state managing module 115. As explained above, the authentication application 102 changes the authentication state. Alternatively, the authentication state managing module 115 can be configured to monitor the progress of the authentication processing and change the authentication state. Alternatively, the OS kernel 110 can include an authentication state changing module (not shown) that changes the authentication state depending on the progress of the authentication processing or a timeout.

As explained above, the transmission/reception routine 114 performs Steps S11 and S12 sequentially. Alternatively, the transmission/reception routine 114 can be configured to perform Steps S12 and S11 sequentially.

According to an aspect of the present invention, operations for a communication with the external device can be stably performed and communication security can be improved.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for communicating with an external device via a network, the apparatus comprising:
an authentication unit that performs an authentication processing to obtain permission for a physical interface including a driver to establish a connection to the network to perform a data transfer;
a detecting unit that detects authentication state information indicating a state of the authentication processing performed by the authentication unit; and
a transmission control unit that receives the authentication state information from the detecting unit and controls, via a central processing unit, a transmission of first data received from a module for communicating via a protocol of an upper-level layer with respect to a data link layer to the external device based on the state of the authentication processing indicated by the authentication state information,
wherein
the transmission control unit deletes the first data in response to the authentication state information indicating that the authentication processing is not successful, and
the transmission control unit determines that the authentication processing is successful and transmits the first data to the driver in response to the authentication unit not receiving authentication state information within a predetermined time period indicating that the authentication processing is successful.

2. The apparatus according to claim 1, wherein when the authentication state information indicates that the authentication processing is successful, the transmission control unit transmits the first data to the driver, and the driver transmits the first data to the external device.

3. The apparatus according to claim 1, wherein
the authentication unit transmits authentication information for obtaining the permission to a first external device,
the transmission control unit determines whether second data to be transmitted to any one of the external device and the first external device is authentication information, and
in response to the second data being the authentication information, the transmission control unit transmits the second data to the driver, and the driver transmits the second data to the first external device.

4. The apparatus according to claim 1, further comprising:
a receiving unit that receives an input for setting the predetermined time period.

5. The apparatus according to claim 1, wherein when permission is not required, the transmission control unit transmits the first data to the driver regardless of the state of the authentication processing.

6. The apparatus according to claim 5, further comprising:
a receiving unit that receives an input for setting whether the permission is required.

7. The apparatus according to claim 1, further comprising:
a management control unit that controls an operation of the driver,
wherein the management control unit includes the transmission control unit and further controls an operation of the transmission control unit.

8. A method for communicating with an external device via a network, the method comprising:
performing, at an authentication unit, an authentication processing to obtain permission for a physical interface including a driver to establish a connection to the network to perform a data transfer;
detecting, at a detecting unit, authentication state information indicating a state of the authentication processing;
receiving, at a transmission control unit implemented via a central processing unit, the authentication state information from the detecting unit;
controlling, at the transmission control unit, transmission of first data received from a module for communicating via a protocol of an upper-level layer with respect to a data link layer to the external device based on the state of the authentication processing indicated by the authentication state information;
deleting, at the transmission control unit, the first data in response to the authentication state information indicating that the authentication processing is not successful; and
determining, at the transmission control unit, that the authentication processing is successful and transmitting the first data to the driver in response to the authentication unit not receiving authentication state information within a predetermined time period indicating that the authentication processing is successful.

9. A non-transitory computer-readable medium storing computer readable instructions thereon that when executed by an apparatus cause the apparatus to perform a method comprising:
performing an authentication processing to obtain permission for a physical interface including a driver to establish a connection to the network to perform a data transfer;
detecting authentication state information indicating a state of the authentication processing;
receiving the authentication state information from a detecting unit;
controlling transmission of first data received from a module for communicating via a protocol of an upper-level layer with respect to a data link layer to the external device based on the state of the authentication processing indicated by the authentication state information;
deleting the first data in response to the authentication state information indicating that the authentication processing is not successful; and
determining that the authentication processing is successful and transmitting the first data to the driver in response to an authentication unit not receiving authentication state information within a predetermined time period indicating that the authentication processing is successful.

* * * * *